(12) United States Patent
Schuck

(10) Patent No.: US 8,924,325 B1
(45) Date of Patent: Dec. 30, 2014

(54) COMPUTERIZED TARGET HOSTILITY DETERMINATION AND COUNTERMEASURE

(75) Inventor: Tod M. Schuck, Lumberton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 555 days.

(21) Appl. No.: 13/023,227

(22) Filed: Feb. 8, 2011

(51) Int. Cl.
*G06N 5/00* (2006.01)

(52) U.S. Cl.
USPC .......................................................... 706/45

(58) Field of Classification Search
None
See application file for complete search history.

(56) References Cited

U.S. PATENT DOCUMENTS

| | | | | |
|---|---|---|---|---|
| 5,545,648 | A * | 8/1996 | Hansebout et al. | 514/352 |
| 6,938,007 | B1 * | 8/2005 | Iulianello et al. | 705/34 |
| 6,967,612 | B1 * | 11/2005 | Gorman et al. | 342/22 |
| 7,092,927 | B2 * | 8/2006 | Clark et al. | 706/50 |
| 7,117,128 | B2 * | 10/2006 | Mohamed et al. | 702/190 |
| 7,153,692 | B2 * | 12/2006 | Campbell et al. | 436/90 |
| 7,394,047 | B1 * | 7/2008 | Pedersen | 244/3.1 |
| 7,473,876 | B1 * | 1/2009 | Pedersen et al. | 244/3.1 |
| 7,511,252 | B1 * | 3/2009 | Pedersen et al. | 244/3.1 |
| 7,644,056 | B2 * | 1/2010 | Khalsa | 706/47 |
| 7,663,528 | B1 * | 2/2010 | Malakian et al. | 342/13 |
| 7,800,527 | B2 * | 9/2010 | Douglass et al. | 342/22 |
| 8,019,712 | B2 * | 9/2011 | Rigdon et al. | 706/47 |
| 8,094,874 | B2 * | 1/2012 | Dugan et al. | 382/100 |
| 8,106,340 | B1 * | 1/2012 | Diaz et al. | 244/3.15 |
| 8,138,965 | B1 * | 3/2012 | Luu et al. | 342/90 |
| 8,272,053 | B2 * | 9/2012 | Markham et al. | 726/23 |
| 8,354,437 | B2 * | 1/2013 | Blight et al. | 514/352 |
| 2004/0139039 | A1 * | 7/2004 | Mon | 706/1 |
| 2007/0026391 | A1 * | 2/2007 | Stoughton et al. | 435/5 |
| 2008/0129581 | A1 * | 6/2008 | Douglass et al. | 342/52 |
| 2009/0052622 | A1 * | 2/2009 | Dugan et al. | 378/57 |
| 2009/0055344 | A1 * | 2/2009 | Dugan et al. | 706/52 |
| 2009/0192962 | A1 * | 7/2009 | Rigdon et al. | 706/46 |
| 2011/0059064 | A1 * | 3/2011 | Possani-Postay et al. | 424/130.1 |
| 2011/0301863 | A1 * | 12/2011 | Auribault et al. | 702/20 |

OTHER PUBLICATIONS

Tod M. Schuck, "Processing Information for Compact Situational Awareness Knoledge Representation in Tactical Information Systems," PhD Dissertation, Stevens Institute of Technology, Dec. 31, 2009.*

SSE Research Day Presentation Abstracts, May 5-6, 2008, Stevens Institute of Technology.*

SSE Spring 2009 Reseach Day Abstracts, Stevens Institute of Technology.*

Schuck et al., "Description of the Choquet Integral for Tactical Knowledge Representation," The 13th Conference on Fusion, Jul. 26-29, 2010, Edinburgh.*

(Continued)

*Primary Examiner* — Kakali Chaki
*Assistant Examiner* — Fuming Wu
(74) *Attorney, Agent, or Firm* — Howard IP Law Group, PC

(57) ABSTRACT

A system for evaluating the threat posed by sensed targets includes sources of predetermined threat hypotheses and doctrinal information, and a Choquet threat discernment processor to identify a threat level represented by each target. A threshold arrangement is coupled evaluates the threat level, and deems those threat levels above the threshold to be suitable for the taking of countermeasures.

12 Claims, 8 Drawing Sheets

(56) References Cited

OTHER PUBLICATIONS

Schuck et al., "Developing Information Fusion Methods for Combat Identification," Chapter 31 in Handbook of Multisensor Data Fusion: Theory and Practice, Second Edition (Martin Liggins II et al (eds.)), published on Sep. 26, 2008 by CRC Press.*

Blasch et al., "Issues and Challenges in Situation Assessment (Level 2 Fusion)," Journal of Advances in Information Fusion vol. 1, No. 2, pp. 122-139, Dec. 2006.*

Warren, "Strategic Information Synthesis by Globular Knowledge Fusion," In Proceedings of Information, Decision and Control, 1999, pp. 407-412. Adelaide, SA, Feb. 8-10, 1999.*

Wigren et al., "Opera Tional Multi-Sensor Tracking for Air Defense," In Proceedings of First Australian Data Fusion Symposium, 1996, pp. 13-18, Adelaide, SA, Nov. 21-22, 1996.*

Schuck et al., "Developing Information Fusion Methods for Combat Identification," in "Handbook of Multisensor Data Fusion: Theory and Practice" (Second Edition) edited by Martin Liggins II et al., pp. 773-812, 2009.*

Brannon et al., "Coordinated machine learning and decision support for situation awareness," Neural Networks 22 (2009), pp. 316-325.*

Warren, Lewis H., "Strategic Information Synthesis by Globular Knowledge Fusion", Information, Decision and Control, 1999. IDC 99. Proceedings (Feb. 8-10, 1999; Location: Adelaide, SA , Australia). 1999, p. 407-412.

Schuck, Tod M., et al., "Description of the Choquet Integral for Tactical Knowledge Representation", Information Fusion (FUSION), 2010 13th Conference, Edinburgh, Scotland, UK; Jul. 26-29, 2010, p. 1-7.

* cited by examiner

```
% FOR THREE INDIVIDUAL IMPORTANCE VALUES:

SUGENO_ROOT (1) =0

SUGENO_ROOT (2) = (-3/(2*COMMON_CERTAINTY_VALUE))+(1/(2*
COMMON_CERTAINTY_VALUE^3))*(COMMON_CERTAINTY_VALUE
^1.5)*(4-3*COMMON_CERTAINTY_VALUE)^0.5

SUGENO_ROOT (3)=(-3/ (2*COMMON_CERTAINTY_VALUE))-(1/2*
COMMON_CERTAINTY_VALUE^3 ))*(COMMON_CERTAINTY_VALUE
^1.5)*(4-3*COMMON_CERTAINTY_VALUE)^0.5
```

FIG. 2B                                              226

```
% FOR THREE INDIVIDUAL IMPORTANCE VALUES:

SUGENO_ROOT (1) =0

SUGENO_ROOT (2) = ((-1*(((CERTAINTY_VALUE(1) *CERTAINTY_
VALUE(2))+(CERTAINTY_VALUE(1)*CERTAINTY_VALUE(3))+
(CERTAINTY_VALUE(2)*CERTAINTY_VALUE(3))))+((((CERTAINTY_
VALUE(1)*CERTAINTY_VALUE(2))+(CERTAINTY-VALUE(1)
*CERTAINTY_VALUE(3))+(CERTAINTY_VALUE(2)*CERTAINTY_VALUE
(3)))^2-(4*CERTAINTY_VALUE(1)*CERTAINTY_VALUE(2)*CERTAINTY_
VALUE(3)*(CERTAINTY_VALUE(1)+CERTAINTY_VALUE(2)+CERTAINTY_
VALUE(3)-1)))^0.5)/(2*CERTAINTY_VALUE(1)*CERTAINTY_VALUE(2)
*CERTAINTY_VALUE(3))

SUGENO_ROOT (3)=((-1*(((CERTAINTY_VALUE(1)*CERTAINTY_VALUE
(2))+(CERTAINTY_VALUE(1)*CERTAINTY_VALUE(3))+(CERTAINTY_
VALUE(2)*CERTAINTY_VALUE(3))))-(((CERTAINTY_VALUE(1)*
CERTAINTY_VALUE(2))+(CERTAINTY_VALUE(1)*CERTAINTY_VALUE(3))
+(CERTAINTY_VALUE(2)*CERTAINTY_VALUE(3)))^2-(4*CERTAINTY_
VALUE(1)*CERTAINTY_VALUE(2)*CERTAINTY_VALUE(3)*(CERTAINTY_
VALUE(1)+CERTAINTY_VALUE(2)+CERTAINTY_VALUE(3)-1)))^0.5)/(2*
CERTAINTY_VALUE(1)*CERTAINTY_VALUE(2)*CERTAINTY_VALUE(3))
```

FIG. 2C                                              224

```
% mμA() IS THE AGGREGATION FACTOR
mμA(1)=0;
% ZERO WILL ALWAYS BE A SOLUTION TO THE EQUATION
FOR i=2:NUMBER_OF_INDIVIDUAL_IMPORTANCE_VALUES+1
    mμA (i)=mμA (i-1)
+CERTAINTY_VALUE* (1+VALID_SUGENO_ROOT*mμA (i-1))
END
```

FIG. 3B
322

```
% FINDING THE DELTA INTERVALS
FOR i=2:NUMBER_OF_INDIVIDUAL_IMPORTANCE_VALUES+1
    DELTA (i)=mμA (i) -mμA (i-1);
END
```

FIG. 3C
324

```
% CALCULATE THE DISCRETE CHOQUET INTEGRAL VALUES
FOR i=2:NUMBER_OF_IMPORTANCE_VALUES+1
    SUBCHOQUET (i)=INDIVIDUAL_IMPORTANCE_VALUE (i) *DELTA (i)
END
CHOQUET=SUM (SUBCHOQUET)
% WEIGHTED AVERAGE (WAV) AND INFORMATION
INCONSISTENCY (OMEGA) CALCULATIONS
WAV=sum (INDIVIDUAL_IMPORTANCE_VALUES) /NUMFACTORS
OMEGA=CHOQUET-WAV
```

FIG. 3D
326

```
% LOOP ACROSS CERTAINTY_VALUE FROM 0.01 TO 1.0 TO
GET CHOQUET STATISTICS
FOR i=0.01:0.01:1
    CERTAINTY_VALUE=i

[DETERMINE SUGENO_ROOTS, INDIVIDUAL_
IMPORTANCE_VALUE, DELTA (i), SUBCHOQUET,
CHOQUET, WAV, OMEGA]

% KEEPS HISTORY OF CHOQUET RESULT
    CHOQUETHIST (CERTAINTY_VALUE)=CHOQUET

% KEEPS HISTORY OF OMEGA RESULT
    OMEGAHIST (CERTAINTY_VALUE)=OMEGA

% KEEPS HISTORY OF WAV RESULT
    WAVHIST (CERTAINTY_VALUE)=WAV

% THIS KEEPS THE VALID SUGENO_ROOT VALUES
    LAMBDAHIST (CERTAINTY_VALUE)=VALID_SUGENO_ROOT

% BUILDS MULTI-DIMENSIONAL ARRAY WITH mμA FOR EACH
ITERATION
    mμAHIST (:,CERTAINTY_VALUE)=mμA

% BUILDS MULTI-DIMENSIONAL ARRAY WITH DELTA FOR
EACH ITERATION
    DELTAHIST (:,CERTAINTY_VALUE)=DELTA (i)

END
                                                    414
```

FIG. 4B

```
% CALCULATE THE POSTERIOR VARIANCE AND STANDARD
DEVIATION OF THE CHOQUET VALUES

% VARIANCE
CHOQUETVAR=VAR (CHOQUETHIST)

% STANDARD DEVIATION
CHOQUETSTDDEV=STD (CHOQUETHIST)

% MEAN
CHOQUETMEAN=MEAN (CHOQUETHIST)         416
```

FIG. 4C

```
% CERTAINTY EQUIVALENT (CE)
% THE RISK_TOLERANCE THRESHOLD ORIGINATES FROM
% BLOCK 28 TACTICAL POLICIES, PROCEDURES,
% DOCTRINES

CERTAINEQUIV=CHOQUETMEAN-((0.5*CHOQUETVAR)/CHOQUETHIST
(RISK_TOLERANCE))
                                                418
```

FIG. 4D

COMPUTERIZED TARGET HOSTILITY DETERMINATION AND COUNTERMEASURE

BACKGROUND

A goal of identification (ID) of an object from multiple sources of information is to combine (or fuse) information at the appropriate levels to derive a classification structure such as "fishing boat", "military aircraft", "F-16", "Toyota pickup", etc. This in turn can help determine the allegiance of the operator of the object, such as being friendly, neutral, or adversarial towards the entity attempting the identification. The entity attempting identification may attempt to determine the intent of the object, such as whether it is a threat to it or to another entity, and how much of a threat it represents. This process is carried out countless times every day not just in military and law enforcement environments, but by people engaged in normal activities.

For example, the simple act by a pedestrian of crossing a street involves the fusion of information from multiple sensors, via the combination of sight, sound, and touch. The human brain processes this information in order to determine if it is safe to cross. If the pedestrian in question begins to cross the street and detects an approaching slow-moving car, then his or her response to this may be very different then if the car is "speeding" with an engine that is "roaring". The first car represents a low potential threat, and the second a much more significant one. This situation becomes more rich in sensor information if the first car is a tiny compact and the second an exotic sports car. Further, if the background to this situation is that the pedestrian is a thief who just robbed a jewelry store, and the "speeding" and "roaring" car is a "police car", then the visceral response will be further elaborated.

The term "tactical knowledge" in a tactical environment (such as security, law enforcement, and military combat) can be defined as "a fluid mix of framed experience, values, contextual information, and expert insight that provides a framework for evaluating and incorporating new experiences and information". Four themes of knowledge representation of information include subject (what), context (when/where), evaluation (how), and expert users (who). Assessing object elements for a commander (i.e. military) results in tactical knowledge and thus makes threat discernment possible.

Improved or alternative threat discernment themes and assessments are desired.

SUMMARY

A system according to an aspect of the disclosure is for evaluating the threat posed by sensed targets. The system comprises a source of predetermined threat hypotheses and a source of doctrinal information. The system also comprises a Choquet threat discernment processor for, using the threat hypotheses and doctrinal information, identifying a threat level represented by each sensed target. A threshold arrangement evaluates the threat level. In a particular embodiment of the system, countermeasures are coupled to the threshold arrangement for engaging those targets in which the threat levels lie above the threshold.

A method according to an aspect of the disclosure is for evaluating the threat posed by sensed targets, and for taking countermeasures against targets posing particular levels of threat. The method comprises the steps of sensing targets, for thereby generating target-representative signals. Threat and doctrinal information are obtained. The target-representative signals are Choquet processed with the threat hypotheses and the doctrinal information, for identifying a threat level represented by or associated with each sensed target. The threat level is compared with a threshold to thereby identify those threat levels exceeding the threshold, and countermeasures are initiated against those targets exceeding the threshold.

A system according to an aspect of the disclosure is for determining the threat level associated with sensed targets, and for taking countermeasures against targets deemed to be a threat. The system comprises a suite of sensors, the suite of sensors including at least a first sensor for sensing a target and for producing target signals representing the sensed information relating to the target. The system also includes at least (a) a kinematic information processor for extracting kinematic target information from the target signals, (b) a cooperative information processor for extracting cooperative information from the target signals, (c) an unintentionally cooperative information processor and (d) a noncooperative information processor for extracting noncooperative information from the additional signals. The system also includes sources of predetermined threat hypotheses and of predetermined tactical or other policies, doctrine, andor procedures. A threat discernment processor is coupled to receive such of the kinematic target information, the intentionally cooperative information, the unintentionally cooperative information, and the noncooperative information as may exist, and is also coupled to receive the predetermined threat hypothesis, the policies, doctrine, andor procedures, for performing Choquet threat discernment processing to identify a threat level represented by each target. A threshold arrangement is coupled to receive the threat level, for deeming those threat levels above the threshold to be suitable for, or indicative of, the taking of countermeasures. Countermeasures are taken against the target in response to the deeming of threat levels above the threshold. A particular embodiment of the system further comprises a source of sensor signal weight factors, and in this embodiment the threat discernment processor comprises (a) a certainty value assigner for assigning a sensor signal certainty value to each of the first, second, and additional signals representing the sensed information relating to the target, (b) a certainty value comparator for comparing the certainty values assigned to the sensor signals to determine if the certainty values are equivalent, (c) a Sugeno fuzzy root calculator for calculating Sugeno fuzzy roots by way of the equivalent certainty values if the pairs are equivalent and for calculating Sugeno fuzzy roots by way of non-equivalent certainty values if the pairs are not equivalent, and (d) a Sugeno fuzzy root disposer for discarding the fuzzy Sugeno roots if they are not valid and for storing the fuzzy Sugeno roots if they are valid. The particular embodiment further comprises a source of hypotheses as to the nature of the threat, and the threat discernment processor further comprises (a) an individual importance value assigner for assigning individual importance values to each of the first, second, and additional signals representing the sensed information relating to the target, the individual importance value being dependent upon how well the first, second, and additional signals comport with the hypotheses, for generating first, second, and additional signals with individual importance values, (b) an aggregation factor calculator for calculating aggregation values using the first, second, and additional signals with individual importance values and the fuzzy Sugeno roots, (c) an interval calculator for calculating delta(i) intervals from the aggregation values, and (d) a Choquet value calculator for calculating Choquet values from the individual importance values and the delta(i) intervals. The particular embodiment of the system may also comprise a source of certainty values representing an a priori determination as to the nature of the countermeasures to be adopted based on the risk tolerance threshold, and the threat discernment processor may further comprise (a) a calculator for calculating Choquet statistics from the individual importance values, for calculating mean and variance from the Choquet statistics, and for calculating the Certainty Equivalent from the mean and variance and from the risk tolerance threshold, (b) a prioritizer coupled to the calculator, for prioritizing the hypotheses based on the Certainty Equivalent, and (c) an answer processor for declaring NO ANSWER if no hypothesis exceeds the Certainty Equivalent and for declaring the most likely hypothesis to be the answer if that hypothesis exceeds the Certainty Equivalent.

A system for determining the threat level associated with one or more sensed targets, and for taking countermeasures against targets deemed to be a threat, includes (i) a plurality of sensors for sensing at least one target, and for producing target signals representing the sensed information relating to the at least one target, (ii) at least one of (a) a kinematic information processor for extracting kinematic target information from the target signals, (b) a cooperative information processor for extracting cooperative information from the target signals, (c) an unintentionally cooperative information processor, and (d) an other processor for extracting non-cooperative information from the target signals, (iii) a source of predetermined threat hypotheses (iv) a source of predetermined tactical or other policies, doctrine, andor procedures (v) a threat discernment processor coupled to receive the kinematic target information if such exists, the intentionally cooperative information if such exists, the unintentionally cooperative information if such exists, and the non-cooperative information if such exists, the predetermined threat hypothesis, and the policies, doctrine, andor procedures, for performing Choquet threat discernment processing to identify a threat level represented by each target, (vi) a risk tolerance threshold arrangement coupled to receive the threat level, for deeming those threat levels above the threshold to be suitable for, or amenable to, the taking of countermeasures, and (vii) countermeasures responsive to threat levels above the threshold for initiating countermeasures (32) against those targets having threat levels above the threshold.

BRIEF DESCRIPTION OF THE DRAWINGS

FIGS. 2A, 2B, 2C, 3A, 3B, 3C, 3D, 4A, 4B, 4C, and 4D together constitute a logic or control chart or diagram illustrating operation of the threat discernment processor of FIG. 1.

DETAILED DESCRIPTION

Figure 1:
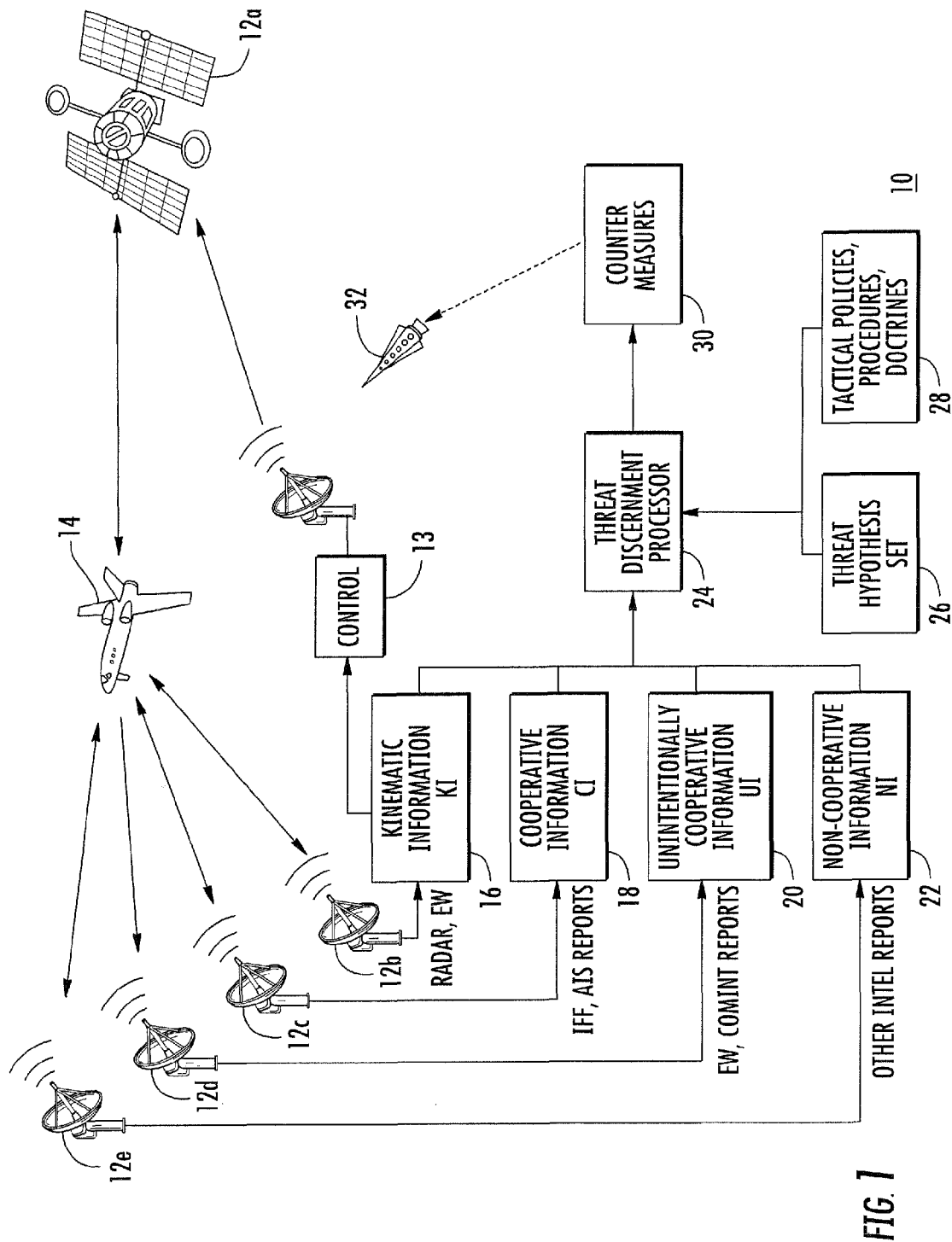
FIG. 1 is a simplified system block diagram illustrating a scenario in which a target is sensed andor reported on, and in which the resulting sensed and reported signals are processed by a threat discernment processor according to an aspect of the disclosure, and in which countermeasures are available against target(s) deemed to exceed a threat threshold.

FIG. 1 is a simplified system block diagram illustrating a scenario 10 in which a target 14 is sensed andor reported on. In FIG. 1, a sensor suite 12 includes an Overhead Nonimaging Infrared (ONIR) spacecraft 12$a$, a land- or ship-based radar system 12$b$, an Identification Friend-or-Foe (IFF) transponder arrangement 12$c$, an electronic support (ES) electronic signal exploitation system 12$d$, and an aircraft andor ship feature characteristics exploitation system 12$e$. ONIR spacecraft is associated with a control/receiver arrangement 13, which makes the sensed signals available terrestrially.

The sensed signals relating to the target(s) which are produced by the ONIR spacecraft 12$a$ and the radar 12$b$ of FIG. 1 are applied to a first computerized processor 16, which extracts kinematic information from the sensor signals. The methodology to do this is well known to those who practice this art.

The sensed signals produced by sensors 12$c$, 12$d$, and 12$e$ of FIG. 1 are applied to processors 18, 20, and 22, respectively, for consolidation of inputs, verification of input information quality, and to check for and remove same-source redundant information (such as multiple IFF replies from the same aircraft). The methodology to do this is well known to those who practice this art.

The processed sensed signals produced by processors 16, 18, 20, and 22 of FIG. 1 are applied to a threat discernment processor 24, which performs Choquet processing with the aid of (a) threat hypotheses previously generated and stored in a memory 26 and (b) tactical policies, doctrine or procedures available from a memory 28, to discern the level of threat to be attributed to each target. This produces a range of discerned threat levels. The threat discernment processor 24 also calculates the Certainty Equivalent (CE). Threat discernment processor 24 also quantifies the threat levels using a decision threshold to thereby identify high or important threats as being above a given level. The threshold level is determined in threat discernment block 24 from doctrines and procedures provided by block 28 and from the calculated Certainty Equivalent (CE). In response to the threat level exceeding the threshold level in block 24, the quantized threat level activates or triggers the countermeasures represented by block 30 and action line 32.

The threat discernment processor 24 of FIG. 1 changes the state of the input information of targets, such as a target 14, to build knowledge from which possible future actions of the target may be estimated or predicted. Processors 16, 18, 20, and 22 of FIG. 1 provide the information input sets to the threat discernment processor 24 for knowledge building. From these processors, the kinematic information ($k_I$), cooperative information ($c_I$), unintentionally cooperative information ($u_I$), and non-cooperative ($n_I$) information from processors 16, 18, 20, and 22, respectively, completely define the information needed for threat discernment. Kinematic information can include target velocity, altitude, range, whether it is flying within an FAA air corridor, and target maneuvers and their extent. Cooperative information can include IFF transponder replies, satellite reporting of navigation information, and radio communication. Unintentionally cooperative information can include radar and communications intercepts, and the detection of specific threat emitters. Non-cooperative information can include the classification of a certain type of jet engine, propeller, or helicopter rotor blade configuration, and the imaging of an airframe. These information sets provide the information that is processed by the threat discernment processor 24. The information sets are used to form "individual importance values" for each of the processors 16, 18, 20, and 22. The individual importance values fall within a range from 0 to 100, where 0 signifies no value and 100 signifies complete or perfect value. For example, a positive encrypted IFF transponder reply would have a very high $c_I$ (cooperative individual importance) value. The interception of an aircraft weather radar might only have a medium $u_I$ (unintentionally cooperative individual importance) value, but a fire control radar intercept would have a very high $u_I$ individual importance value. Information from processors 16, 18, 20, and 22 of FIG. 1 forms the complete range of information available to the threat discernment processor 24.

Figure 2A:
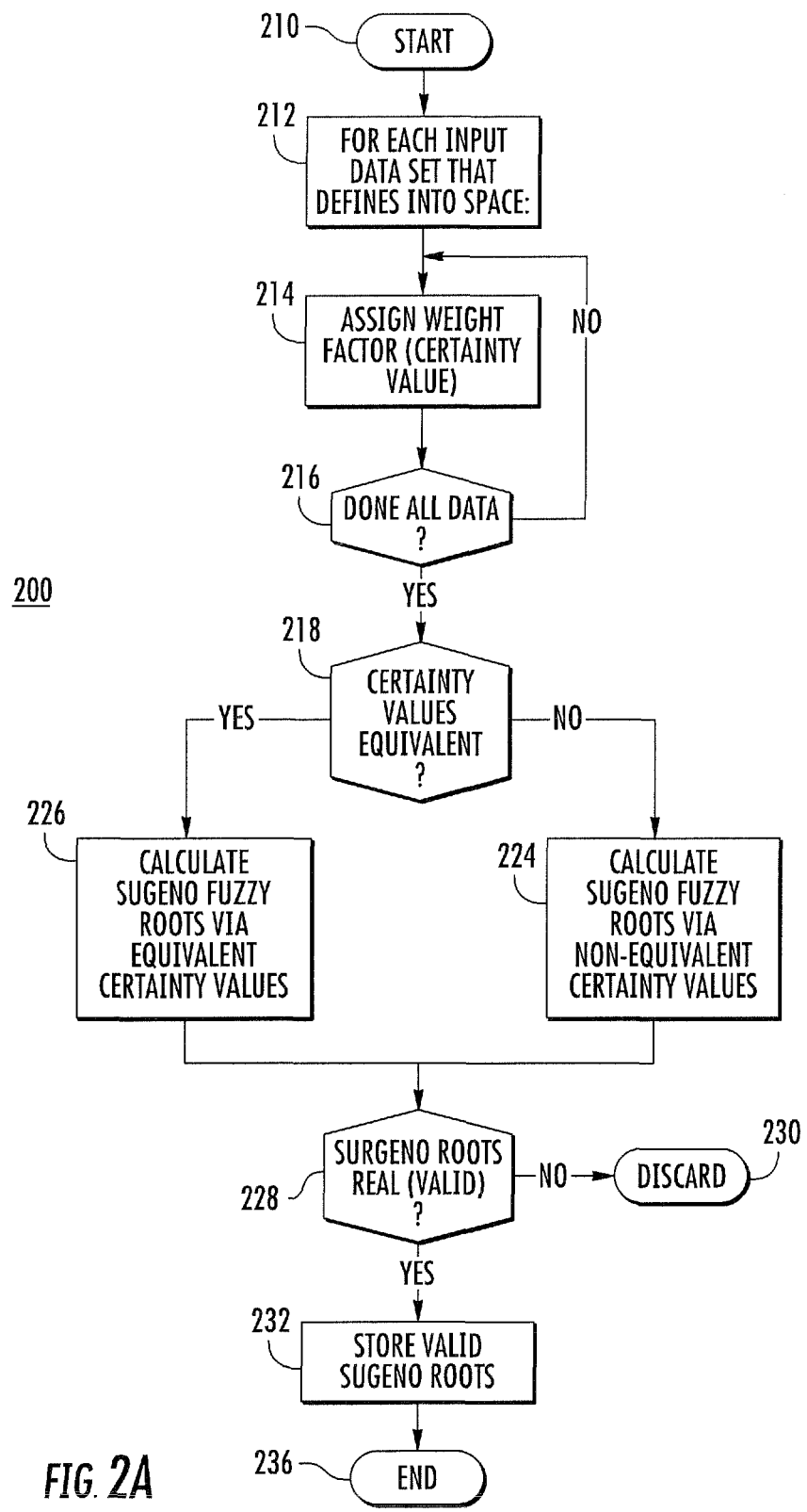

FIG. 2A is a simplified logic or control flow chart or diagram 200 illustrating the computerized processing in block 24 of FIG. 1 for weighting each information input set from processors 16, 18, 20, and 22 in FIG. 1 with a "certainty value", which is a fractional number between 0 and 1, for calculating Sugeno fuzzy roots by way of equivalent and non-equivalent certainty values, and for storing valid Sugeno roots. A Sugeno root defines the additivity of the subsets of information that originate from processors 16, 18, 20, and 22 in FIG. 1. In FIG. 2A, the logic 200 begins at a START block 210, and proceeds to a block 212. Block 212 represents manipulation of running variables and indices for iteratively performing calculations for each information or data set defining the information space, which is represented by the information from blocks 16, 18, 20, and 22 in FIG. 1. Information from all these blocks will seldom be present at the same time, and some will often be missing, so block 212 iterates across inputs so that all types of information are exercised or implicated. From block 212, logic 200 flows to a block 214. Block 214 represents the specification of a weight or certainty value for each information set. The weighting is provided from information stored in block 28 of FIG. 1. This stored information is derived from known sensor accuracy and capability values and known environmental characteristics. Each information set from processors 16, 18, 20, and 22 in FIG. 1 has known accuracy values derived from performance tests on their respective sensors 12$a$, 12$b$, 12$c$, 12$d$, and 12$e$. These certainty values are assigned to the information sets in block 214. For example, it will be known how often a sensor that feeds processor 20 will produce an incorrect answer. So given a target 14 in FIG. 1, sensor 12$d$ might produce the correct answer almost all the time which would equate to a certainty value of nearly 1. The converse, where the information from sensor 12$d$ should be ignored because it is often incorrect or misleading, would equate to a certainty value near 0. The methodology to do this is well known to those who practice this art. After each iteration through blocks 212 and 214, the logic 200 arrives at a decision block 216. Decision block 216 determines whether weights or certainty values have been associated with each information set. If all information sets have not been weighted, the logic leaves decision block 216 by the NO output, and returns to block 214 for addition of weights or certainty values to the next information set. Eventually, all the information or information sets will have been processed, and when the logic again arrives at decision block 216, the logic is routed by the YES output to a further decision block 218. Decision block 218 determines if the certainty values associated with the information sets are equivalent; it does this by looking across all the information sets to note which information sets have the same weights or certainty values.

The purpose for checking the equivalence of certainty values in decision block 218 of FIG. 2A is that, if they are equivalent, which they might be under some circumstances due to the estimation of performance of some sensors, then the processing load for determining the Sugeno roots can be reduced due to a simplified mathematical process. Decision block 218 routes the logic by its YES output to block 226 if the certainty values to be used are equivalent to each other which allows for computations with less computer processor loading. Decision block 218 routes the logic by its NO output to block 224 if the certainty values from block 218 are not equivalent to each other. Thus, if the certainty values are equivalent, the processing to generate the Sugeno roots is performed in block 226, and not in block 224, and if they are not equivalent, then processing is performed in block 224; the processing of block 224 is more intensive than that of block 226. Block 226 calculates the Sugeno fuzzy roots using the equivalent certainty value at each iteration, and block 224 calculates the Sugano fuzzy roots using non-equivalent certainty values. The Sugeno root algorithm for block 226 is illustrated in pseudocode form in FIG. 2B assuming that three individual importance values are available. In FIG. 2B, if the assigned certainty values from block 214 are equivalent, the variable "common_certainty_value" is created to represent the common equivalent certainty value and the solution to the polynomial equation is shown to be calculated. The Sugeno root algorithm for block 224 is illustrated by the pseudocode in FIG. 2C, also assuming that three individual importance values are available. The pseudocode of FIG. 2C is much more extensive than that of FIG. 2B, reflecting the greater processing workload. In FIG. 2C, since the certainty values are not equivalent, each one of the certainty values is represented by the indices (1), (2), or (3) and the polynomial equation is shown to be solved via long form polynomial processing. Such long-form polynomial processing is well understood by those skilled in the art. By either path, the logic of FIG. 2A flows, at each iteration, to a further decision block 228. Decision block 228 determines which root of the Sugeno roots is valid, where a root is defined as valid when it is quantitatively greater than or equal to $-1$, such as any number in the range extending from $-1$ to positive infinity, and is defined as not valid if quantitatively less than $-1$, such as any number less than $-1^-$. At this point, if the Sugeno root is less than or equal to $-1$, such as any number from $-1^-$ to negative infinity (excluding $-1$), then logic 200 follows the NO output from decision block 228 and arrives at block 230, representing discarding of the invalid Sugeno root. If the Sugeno root is greater (more positive) than or equal to $-1$, then the logic 200 follows the YES output of decision block 228 and the Sugeno roots are stored for use, as suggested by block 232. From block 232, the logic 200 flows to an END block 236

Figure 3A:
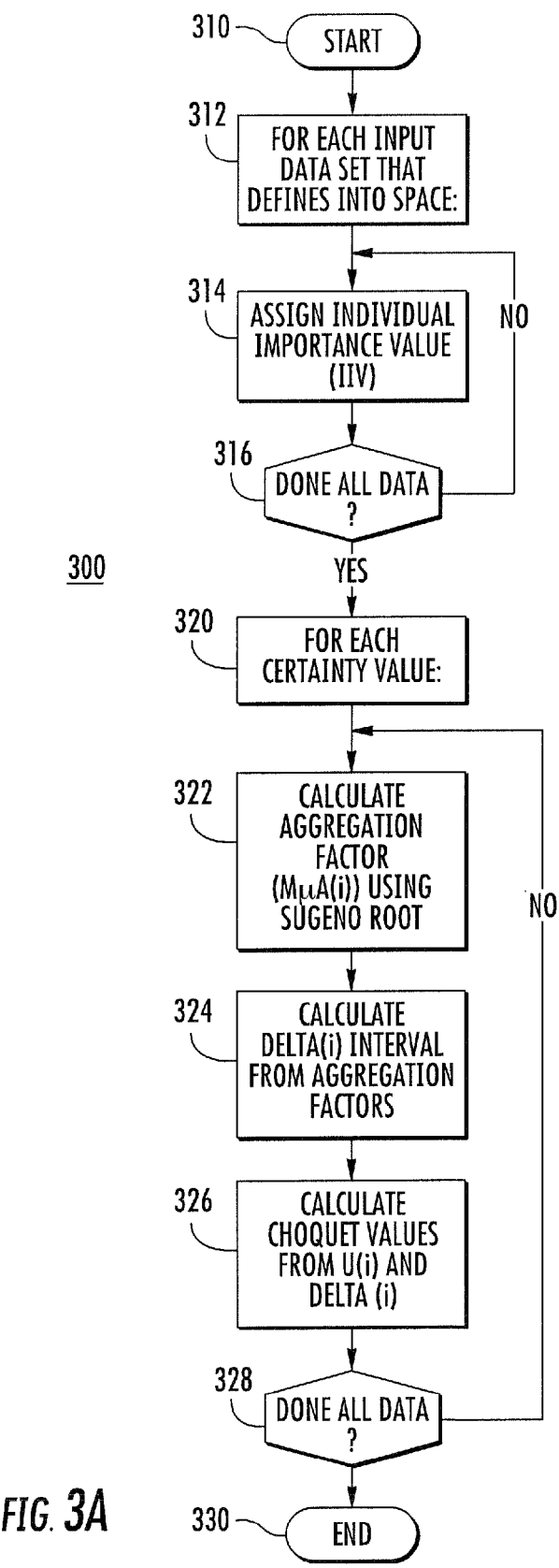

FIG. 3A is a simplified logic or control flow chart or diagram illustrating additional computerized processing 300 performed in block 24 of FIG. 1 for applying "individual importance values" to each information input set. Each Sugeno root calculated in logic 200 is made available to logic 300 of FIG. 3A. The individual importance values differ from the certainty values in that the certainty values describe the quality of the information, while the individual importance values describe how much or how well they support or agree with each hypothesis in the Threat Hypothesis Set from block 26 in FIG. 1. Complete or perfect agreement with an individual importance value is represented by a value of 100 while no agreement is represented by a value of 0.

In FIG. 3A, the logic 300 begins at a START block 310, and proceeds to a block 312. Block 312 represents manipulation of running variables and indices for iteratively performing calculations for each type of input information set defining the information space. As mentioned, the information space is the information originating with blocks 16, 18, 20, and 22 of FIG. 1. Information from all of these blocks will seldom be present at the same time, and often some will be missing, so block 312 insures correct parsing of the information and prevents processing if insufficient new information is present. As such, processing in block 312 is automatic based on the amount of information present and whether all types are available from blocks 16, 18, 20, and 22 of FIG. 1. The methodology to do this is well known to those who practice this art. From block 312, logic 300 flows to a block 314, which represents the assignment of the individual importance values for each information set. The individual importance values IIV are weightings that are calculated from information stored in block 26 in FIG. 1, which stores all of the threat hypotheses for a given threat type. Thus, each information set will be associated with or "have" a plurality of individual importance values, one for each of the hypotheses stored in block 26 of FIG. 1. These hypotheses are pre-computed according to techniques that are known to those who are skilled in the art. The individual importance value weightings result from a comparison of the input information set with the hypothesis. Thus, the comparison is performed in block 24 of FIG. 1, and the individual weighting values result from the comparison of the data set with the hypothesis. As an example, if the hypothesis currently being evaluated is "the potential threat (14 of FIG. 1) is attacking my position," then a crypto-secure information response from block 18 of FIG. 1 would receive an individual importance value weighting of 0, even though such a response would have a very high certainty equivalent. On the other hand, if the hypothesis with which such data were compared were "the potential threat is a friend" would have an individual importance value weighting of near 100, as it would perfectly match such a hypothesis. After each iteration through blocks 312 and 314, the logic 300 arrives at a decision block 316. Decision block 316 determines whether individual importance values have been associated with each information set. If all information sets have not had the individual importance values applied, the logic leaves decision block 316 by the NO output, and returns to block 314 for addition of individual importance values to the next information set. Eventually, all the information or information sets will have been processed, and when the logic again arrives at decision block 316, the logic is routed by the YES output to processing block 320. At this point in the processing, each data set is associated with a plurality of individual importance values equal in number to the number of hypotheses available for evaluation.

As so far described, blocks 314 and 316 of logic 300 of FIG. 3A apply a plurality of individual importance values to each of the data sets. The remainder of logic 300 (blocks 320, 322, 324, 326, and 328) determines (a) the aggregation factors using the Sugeno roots, (b) the delta(i) interval (spacing) between the aggregation factors, and (c) the Choquet values from the individual importance values and the delta(i) intervals. The aggregation factors define the weighted additivity of the Sugeno roots subsets of information that originate from processors 16, 18, 20, and 22 in FIG. 1. From block 316, logic 300 proceeds to a block 320. Block 320 ensures that all aggregation factors are calculated for each certainty value. From block 320, logic 300 flows to a block 322, which represents the calculation of the aggregation factors. Details of the processing of block 322 are set forth in the pseudocode of FIG. 3B. In FIG. 3B, the aggregation factors are shown to be calculated via a loop from the previous aggregation factor (the first one is always equal to zero), the certainty value and the valid Sugeno roots. Block 324 of FIG. 3A represents calculation of the delta(i) intervals or the statistical distance between the aggregation factors. Details of the processing in block 324 are set forth in the pseudocode of FIG. 3C. In FIG. 3C the delta intervals are shown to be calculated for each individual importance value by subtracting from each aggregation factor mµA(i) the previous aggregation factor mµA(i−1). The aggregation factors and the delta(i) interval results are passed from block 324 of FIG. 3A to block 326. Block 326 represents the calculation of the Choquet values from both the aggregation factors from block 322 and the delta intervals from block 324. Details of the processing in block 326 are set forth in the pseudocode of FIG. 3D. The Choquet values, the weighted average (WAV), and information inconsistency (omega) values are calculated in FIG. 3D. The Choquet values are the sum of the subchoquet values where the subchoquet values are calculated for each individual importance value multiplied by the corresponding delta function. The weighted average (WAV) is the average of the individual importance values and the omega values are calculated from the Choquet minus the WAV. After each iteration through blocks 322, 324, and 326, the logic 300 of FIG. 3A arrives at a decision block 328. Decision block 328 determines whether all Choquet values have been calculated. If all Choquet values have not been calculated, the logic leaves decision block 328 by the NO output, and returns to block 322 for additional computations. Eventually, all the Choquet values will have been determined, and when the logic again arrives at decision block 328, the logic is routed by the YES output to end at block 330.

Figure 4A:
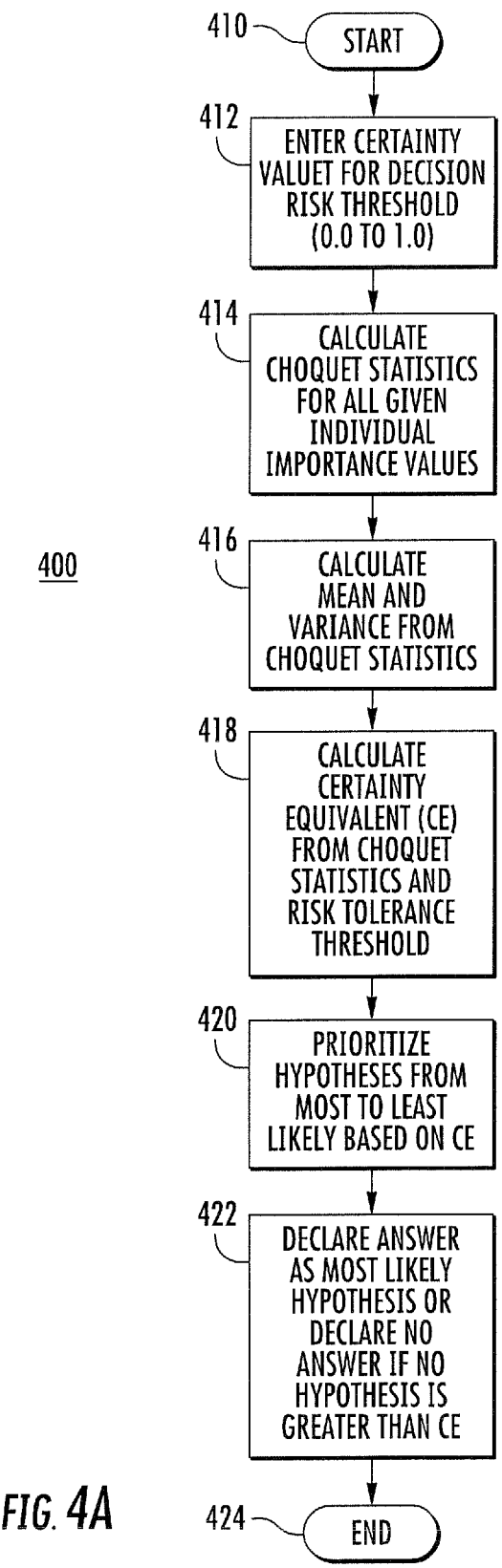

FIG. 4A is a simplified logic or control flow chart or diagram 400 further illustrating the computerized processing in block 24 of FIG. 1. Logic 400 uses the results from logic 300 of FIG. 3A to determine the Certainty Equivalent (CE) values for each set of hypotheses and to calculate the Choquet statistics of mean and variance. The CE is known from utility theory and is calculated based on the risk tolerance of an equivalent human decision-maker, automated via a computer surrogate. The logic 400 begins at a START block 410, and proceeds to a block 412. Block 412 represents entry of the certainty values from memory block 28 of FIG. 1. The certainty values entered into block 412 from block 28 represent an a priori determination as to the nature of the countermeasures to be adopted based on the risk threshold. The "risk threshold" exists, or is embedded, in the tactical policies and doctrines of block 28 of FIG. 1. The individual importance values and risk thresholds upon which a decision may be based pass from block 412 to block 414 of logic 400. Block 414 is where all possible Choquet values for all possible importance values for the given set of certainty values are calculated. This determines the distribution of certainty. Details of the logic of block 414 appear in the pseudocode of FIG. 4B. In FIG. 4B the Choquet statistics across all certainty values for the given individual importance values, so the complete histories of the Choquet values (choquethist), omega (omegahist), WAV (WAVhist), Sugeno roots (lambdahist), aggregation factors (muAhist), and delta values (deltahist) are calculated, and the values are stored in arrays. The logic 400 flows from block 414 to a block 416. In block 416, the mean and variance are calculated from the Choquet statistics previously calculated in block 414. Details of the logic of block 416 appear in the pseudocode of FIG. 4C. In FIG. 4C the statistical variance, standard deviation, and mean are calculated; the methods to do so are well known to those who practice the art. The mean and variance are passed from block 416 to a block 418. In block 418, the Certainty Equivalent (CE) is calculated from the mean and variance values previously calculated in block 416 and risk threshold from block 28. Details of the logic of block 418 appear in the pseudocode of FIG. 4D. The CE values calculated by block 418 are passed to block 420, where each CE and its associated threat hypothesis is prioritized relative to the others based on most- to least-likely as determined by the CE values. These hypotheses and CE values are passed to block 422, where they are compared to the certainty value recorded in block 412. If one or more of these hypotheses and their CE exceed the certainty value threshold, then these are passed to block 30 in FIG. 1 and the entire process of logic 400 terminates in block 424 of FIG. 4A. Block 30 of FIG. 1 represents the launching or initiating of countermeasures against the target in response to a hypothesis representing a hostile target at a certainty exceeding the threshold associated with block 422.

A system (10) according to an aspect of the disclosure is for evaluating the threat posed by sensed targets (14) and for taking countermeasures (30, 32) against certain threats. The system (10) comprises a source (26) of predetermined threat hypotheses and a source (28) of doctrinal information. The system (10) also comprises a Choquet threat discernment processor (24) for, using the threat hypotheses and doctrinal information, identifying a threat level represented by each sensed target. A threshold arrangement (418) evaluates the threat level. Countermeasures are coupled to the threshold arrangement (418) for engaging those targets in which the threat levels lie above the threshold.

A method according to an aspect of the disclosure is for evaluating the threat posed by sensed targets, and for taking countermeasures against targets posing particular levels of threat. The method comprises the steps of sensing targets, for thereby generating target-representative signals. Threat and doctrinal information are obtained. The target-representative signals are Choquet processed with the threat hypotheses and the doctrinal information, for identifying a threat level represented by or associated with each sensed target. The threat level is compared with a threshold to thereby identify those threat levels exceeding the threshold, and countermeasures are initiated against those targets exceeding the threshold.

A system (10) according to an aspect of the disclosure is for determining the threat level associated with sensed targets (14), and for taking countermeasures (32) against targets (14) deemed to be a threat. The system (10) comprises a suite of sensors (12), the suite of sensors including at least a first sensor (12a) for sensing a target (14) and for producing target signals representing the sensed information relating to the target. The system (10) also includes at least (a) a kinematic information processor (16) for extracting kinematic target information from the target signals, (b) a cooperative information processor (18) for extracting cooperative information from the target signals, (c) an unintentionally cooperative information processor (20) and (d) a noncooperative information processor (22) for extracting noncooperative information from the additional signals. The system also includes sources of predetermined threat hypotheses (26) and of predetermined tactical or other policies, doctrine, andor procedures (28). A threat discernment processor (24) is coupled to receive such of the kinematic target information, the intentionally cooperative information, the unintentionally cooperative information, and the noncooperative information as may exist, and is also coupled to receive the predetermined threat hypothesis, the policies, doctrine, andor procedures, for performing Choquet threat discernment processing (200, 300, 400) to identify a threat level represented by each target (14). A threshold arrangement (24, 418) is coupled to receive the threat level, for deeming those threat levels above the threshold to be suitable for, or indicative of, the taking of countermeasures. Countermeasures (30, 32) are taken against the target in response to the deeming of threat levels above the threshold. A particular embodiment of the system (10) further comprises a source (28) of sensor signal weight factors, and in this embodiment the threat discernment processor comprises (a) a certainty value assigner (214) for assigning a sensor signal certainty value to each of the first, second, and additional signals representing the sensed information relating to the target, (b) a certainty value comparator (218) for comparing the certainty values assigned to the sensor signals to determine if the certainty values are equivalent, (c) a Sugeno fuzzy root calculator (224, 226) for calculating Sugeno fuzzy roots by way of the equivalent certainty values if the pairs are equivalent and for calculating Sugeno fuzzy roots by way of non-equivalent certainty values if the pairs are not equivalent, and (d) a Sugeno fuzzy root disposer (228, 230, 232) for discarding the fuzzy Sugeno roots if they are not valid and for storing the fuzzy Sugeno roots if they are valid. The particular embodiment further comprises a source (26) of hypotheses as to the nature of the threat, and the threat discernment processor (24) further comprises (a) an individual importance value assigner (314) for assigning individual importance values to each of the first, second, and additional signals representing the sensed information relating to the target, the individual importance value being dependent upon how well the first, second, and additional signals comport with the hypotheses, for generating first, second, and additional signals with individual importance values, (b) an aggregation factor calculator (322) for calculating aggregation values using the first, second, and additional signals with individual importance values and the fuzzy Sugeno roots, (c) an interval calculator (324) for calculating delta(i) intervals from the aggregation values, and (d) a Choquet value calculator (326) for calculating Choquet values from the individual importance values and the delta(i) intervals. The particular embodiment of the system (10) may also comprise a source (28) of certainty values representing an a priori determination as to the nature of the countermeasures to be adopted based on the risk tolerance threshold, and the threat discernment processor (24) may further comprise (a) a calculator (414, 416, 418) for calculating Choquet statistics from the individual importance values (314), for calculating mean and variance from the Choquet statistics, and for calculating (418) the Certainty Equivalent from the mean and variance and from the risk tolerance threshold (from 28), (b) a prioritizer (420) coupled to the calculator, for prioritizing the hypotheses based on the Certainty Equivalent, and (c) an answer processor (422) for declaring NO ANSWER if no hypothesis exceeds the Certainty Equivalent and for declaring the most likely hypothesis to be the answer if that hypothesis exceeds the Certainty Equivalent.

A system (10) for determining the threat level associated with one or more sensed targets (14), and for taking countermeasures (32) against targets (14) deemed to be a threat, includes (i) a plurality of sensors (12a-12e) for sensing at least one target (14), and for producing target signals representing the sensed information relating to the at least one target, (ii) at least one of (a) a kinematic information processor (16) for extracting kinematic target information from the target signals, (b) a cooperative information processor (18) for extracting cooperative information from the target signals, (c) an unintentionally cooperative information processor (20), and (d) an other processor (22) for extracting non-cooperative information from the target signals, (iii) a source (26) of predetermined threat hypotheses (iv) a source (28) of predetermined tactical or other policies, doctrine, andor procedures (v) a threat discernment processor (24) coupled to receive the kinematic target information if such exists, the intentionally cooperative information if such exists, the unintentionally cooperative information if such exists, and the non-cooperative information if such exists, the predetermined threat hypothesis, and the policies, doctrine, andor procedures, for performing Choquet threat discernment processing (200, 300, 400) to identify a threat level represented by each target (14), (vi) a risk tolerance threshold arrangement (24, 418) coupled to receive the threat level, for deeming those threat levels above the threshold to be suitable for the taking of countermeasures, and (vii) countermeasures (30, 32) responsive to threat levels above the threshold for initiating countermeasures (32) against the target(s) (14) having threat levels above the threshold.

What is claimed is:

1. A system for evaluating the threat posed by sensed targets and for taking countermeasures against certain threats, said system comprising:
   at least one memory device for storing predetermined threat hypotheses and doctrinal information representing the nature of a particular type of threat, and a risk tolerance attributed to that particular type of threat, beyond which countermeasures are taken against said threat according to said doctrinal information;
   a Choquet threat discernment processor, the threat discernment processor responsive to said threat hypotheses and doctrinal information stored on the at least one memory device, and configured to execute instructions for performing the step of:
      identifying a threat level represented by each sensed target;
   a threshold arrangement for evaluating the threat level; and
   countermeasures responsive to said threshold arrangement for engaging those targets in which the threat levels lie above the threshold,
   wherein said Choquet threat discernment processor:
      a) determines certainty values representing an accuracy level of the target data for a sensed target as sensed by a given sensor;
      b) determines individual importance value weights, one for each of said predetermined threat hypotheses, each said importance value weight of the sensed target data having a value representing the degree of correlation of the sensed target data with a given one of said predetermined threat hypotheses;
      c) determines Certainty Equivalent (CE) values for each set of threat hypotheses based on Choquet statistical processing of mean and variance for said given individual importance value weights for a given set of certainty values of the sensed target data and the risk tolerance attributed to that particular type of threat from said doctrinal information, wherein each threat hypothesis has a corresponding CE value corresponding to the calculated threat level of the sensed target.

2. A method for evaluating the threat posed by sensed targets, and for taking countermeasures against targets posing particular levels of threat, said method comprising the steps of:
   sensing targets for generating target-representative signals;
   obtaining threat hypotheses representing the nature of a particular type of threat;
   obtaining doctrinal information providing a risk tolerance attributed to a particular threat, beyond which countermeasures are taken against said threat according to said doctrinal information;
   Choquet processing said target-representative signals, with said threat hypotheses and said doctrinal information for identifying a threat level represented by each sensed target, including determining an individual importance value weight for each of said threat hypotheses representing the degree of correlation of the sensed target data with a given one of said threat hypotheses; and determining Certainty Equivalent (CE) values for each set of threat hypotheses based on Choquet statistical processing of mean and variance for said given individual importance value weights for a given set of certainty values representing an accuracy level of the sensed target data, and the risk tolerance attributed to that particular type of threat from said doctrinal information, wherein each threat hypothesis has a corresponding CE value corresponding to a calculated threat level of the sensed target;
   comparing said threat level with a threshold to thereby identify those threat levels exceeding said threshold; and
   initiating countermeasures against those targets exceeding said threshold.

3. A system for determining the threat level associated with sensed targets, and for taking countermeasures against targets deemed to be a threat, said system comprising:
   a suite of sensors, said suite of sensors including at least a first sensor for sensing a target and for producing target signals representing the sensed information relating to said target;
   at least (a) a kinematic information processor for extracting kinematic target information from said target signals, (b) a cooperative information processor for extracting cooperative information from said target signals, (c) an unintentionally cooperative information processor and (d) a noncooperative information processor for extracting noncooperative information from additional signals;
   a source of predetermined threat hypotheses representing the nature of a particular type of threat;
   a source of predetermined tactical or other policies, doctrine, andor procedures providing a risk tolerance attributed to a particular threat, beyond which countermeasures are taken against said threat according to said doctrinal information;
   a threat discernment processor coupled to receive such of said kinematic target information, said intentionally cooperative information, said unintentionally cooperative information, said noncooperative information as may exist, and also coupled to receive said predetermined threat hypotheses, said policies, doctrine, andor procedures, for performing Choquet threat discernment processing to identify a threat level represented by each target, said threat discernment processor configured to determine an individual importance value weight for each of said threat hypotheses representing the degree of correlation of the sensed target data with a given one of said threat hypotheses; and determine Certainty Equivalent (CE) values for each set of threat hypotheses representing a calculated threat level of the sensed target and based on Choquet statistical processing of mean and variance for said given individual importance value weights for a given set of sensor signal certainty values representing an accuracy level of the sensed target data, and the risk tolerance attributed to that particular type of threat from said doctrinal information;
   a threshold arrangement coupled to receive said threat level, for deeming those threat levels above the threshold to be suitable for the taking of countermeasures; and
   countermeasures responsive to the deeming of threat levels above said threshold for application of countermeasures against the target(s) so deemed.

4. A system according to claim 3, wherein said threat discernment processor comprises:
   a certainty value assigner for assigning said sensor signal certainty values to said target signals and additional signals representing the sensed information relating to said target;
   a certainty value comparator for comparing the certainty values assigned to said target signals and additional signals to determine if said certainty values are equivalent;

a Sugeno fuzzy root calculator for calculating Sugeno fuzzy roots by way of said equivalent certainty values if said pairs are equivalent and for calculating Sugeno fuzzy roots by way of non-equivalent certainty values if said pairs are not equivalent; and a Sugeno fuzzy root disposer for discarding said fuzzy Sugeno roots if they are not valid and for storing said fuzzy Sugeno roots if they are valid.

5. A system according to claim 4, further comprising a source of hypotheses as to the nature of the threat, and wherein said threat discernment processor further comprises:

an individual importance value assigner for assigning individual importance values to said target signals and additional signals representing the sensed information relating to said target;

an aggregation factor calculator for calculating aggregation values using said target signals and additional signals with individual importance values and said fuzzy Sugeno roots;

an interval calculator for calculating delta(i) intervals from said aggregation values; and a Choquet value calculator for calculating Choquet values from the individual importance values and the delta(i) intervals.

6. A system according to claim 3 further comprising a source of certainty values representing an a priori determination as to the nature of the countermeasures to be adopted based on the risk tolerance threshold; and wherein said threat discernment processor further comprises:

a prioritizer for prioritizing said hypotheses based on said Certainty Equivalent; and an answer processor for declaring NO ANSWER if no hypothesis exceeds the Certainty Equivalent and for declaring the most likely hypothesis to be the answer if that hypothesis exceeds the Certainty Equivalent.

7. A system for determining the threat level associated with one or more sensed targets, and for taking countermeasures against targets deemed to be a threat, said system comprising:

a plurality of sensors for sensing at least one target, and for producing target signals representing the sensed information relating to said at least one target;

at least one of (a) a kinematic information processor for extracting kinematic target information from said target signals, (b) a cooperative information processor for extracting cooperative information from said target signals, (c) an unintentionally cooperative information processor, and (d) an other processor for extracting non-cooperative information from said target signals;

a source of predetermined threat hypotheses;

a source of predetermined tactical or other policies, doctrine, andor procedures;

a threat discernment processor coupled to receive said kinematic target information if such exists, said intentionally cooperative information if such exists, said unintentionally cooperative information if such exists, and said non-cooperative information if such exists, said predetermined threat hypotheses, and said policies, doctrine, andor procedures, for performing Choquet threat discernment processing to identify a threat level represented by each target, said threat discernment processor configured to determine an individual importance value weight for each of said threat hypotheses representing the degree of correlation of the sensed target data with a given one of said threat hypotheses; and determine Certainty Equivalent (CE) values for each set of threat hypotheses based on Choquet statistical processing of mean and variance for said given individual importance value weights for a given set of certainty values representing an accuracy level of the sensed target data, and the risk tolerance attributed to that particular type of threat from said doctrinal information, wherein each threat hypothesis has a corresponding CE value corresponding to a calculated threat level of the sensed target;

a risk tolerance threshold arrangement coupled to receive said threat level, for deeming those threat levels above the threshold to be suitable for the taking of countermeasures; and countermeasures responsive to threat levels above said threshold for initiating countermeasures against the target(s) having threat levels above said threshold.

8. A system for determining the threat level associated with one or more sensed targets, and for taking countermeasures against targets deemed to be a threat, said system comprising:

sensors for sensing at least one target, and for producing target signals representing the sensed information relating to said target;

at least one of (a) a kinematic information processor for extracting kinematic target information from said target signals, (b) a cooperative information processor for extracting cooperative information from said target signals, (c) an unintentionally cooperative information processor, and (d) an other processor for extracting non-cooperative information from said target signals;

a source of predetermined threat hypotheses;

a source of predetermined tactical or other policies, doctrine, andor procedures;

a threat discernment processor coupled to receive such of (i) said kinematic target information, (ii) said cooperative information, (iii) said unintentionally cooperative information, and (iv) said non-cooperative information as may exist, and also coupled to receive said predetermined threat hypothesis, and said policies, doctrine, andor procedures, for performing Choquet threat discernment processing to identify a threat level represented by each target, said threat discernment processor configured to determine an individual importance value weight for each of said threat hypotheses representing the degree of correlation of the sensed target data with a given one of said threat hypotheses; and determine Certainty Equivalent (CE) values for each set of threat hypotheses based on Choquet statistical processing of mean and variance for said given individual importance value weights for a given set of certainty values representing an accuracy level of the sensed target data, and the risk tolerance attributed to that particular type of threat from said doctrinal information, wherein each threat hypothesis has a corresponding CE value corresponding to a calculated threat level of the sensed target;

a threshold arrangement coupled to receive said threat level, for deeming those threat levels above the threshold to be suitable for the taking of countermeasures; and countermeasures responsive to the deeming of threat levels above said threshold for application of countermeasures against the target(s) so deemed.

9. A system for evaluating the threat posed by sensed targets for taking countermeasures against certain target threats, said system comprising:

a memory device storing threat hypotheses and doctrinal information representing the nature of a particular type of threat, and a risk tolerance attributed to that particular type of threat, beyond which countermeasures are taken against said threat according to said doctrinal information;

a Choquet threat discernment processor responsive to said threat hypotheses and doctrinal information stored on the memory device and configured to identify a threat level represented by each sensed target by:
  a) determining certainty values representing accuracy levels of sensed target data corresponding to a given sensor;
  b) determining individual importance weights, one for each of said threat hypotheses, based on the sensed target data, each individual importance weight having a value representing the degree of correlation of the sensed target data with a given one of said predetermined threat hypotheses;
  c) determining Certainty Equivalent (CE) values for each set of threat hypotheses based on Choquet statistical processing of mean and variance for individual importance weights for a given set of certainty values of the sensed target data and the risk tolerance attributed to that particular type of threat from said doctrinal information, each threat hypothesis having a corresponding CE value representing the calculated threat level of the sensed target;
a threshold arrangement for comparing each said calculated threat level with a threshold to thereby identify those threat levels exceeding said threshold for initiating countermeasures against said corresponding targets.

10. A system according to claim 9, wherein said Choquet threat discernment processor comprises:
  a certainty value assigner for assigning said certainty values representing accuracy levels of sensed target data corresponding to a given sensor;
  a certainty value comparator for comparing the certainty values assigned to said multiple sensors to determine if said certainty values are equivalent;
  a Sugeno fuzzy root calculator for calculating Sugeno fuzzy roots by way of said equivalent certainty values if said pairs are equivalent and for calculating Sugeno fuzzy roots by way of non-equivalent certainty values if said pairs are not equivalent; and
  a Sugeno fuzzy root disposer for discarding said fuzzy Sugeno roots if they are not valid and for storing said fuzzy Sugeno roots if they are valid.

11. A system according to claim 10, wherein said Choquet threat discernment processor further comprises:
  an individual importance value assigner for assigning individual importance values representing the sensed information relating to said target,
  an aggregation factor calculator for calculating aggregation values using said target data with individual importance values and said fuzzy Sugeno roots;
  an interval calculator for calculating delta(i) intervals from said aggregation values; and
  a Choquet value calculator for calculating Choquet values from the individual importance values and the delta(i) intervals.

12. A system according to claim 9, further comprising a source of certainty values representing an a priori determination as to the nature of the countermeasures to be adopted based on the risk tolerance threshold; and wherein said Choquet threat discernment processor further comprises:
  a calculator that calculates the Choquet statistics from said individual importance values, the mean and variance from said Choquet statistics, the Certainty Equivalent from the mean and variance and from the risk tolerance threshold;
  a prioritizer for prioritizing said hypotheses based on said Certainty Equivalent; and
  an answer processor for declaring NO ANSWER if no hypothesis exceeds the Certainty Equivalent and for declaring the most likely hypothesis to be the answer if that hypothesis exceeds the Certainty Equivalent.

* * * * *